United States Patent
Matsumura (10) Patent No.: US 6,321,590 B1
(45) Date of Patent: Nov. 27, 2001

(54) LEAKAGE MEASURING DEVICE

(75) Inventor: Shizuo Matsumura, Kounosu (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/356,972

(22) Filed: Jul. 19, 1999

(51) Int. Cl.$^7$ .................................................. G01M 3/04
(52) U.S. Cl. .................................................. 73/40
(58) Field of Search .................... 73/37, 40, 49.1, 73/49.2, 49.3

(56) References Cited

U.S. PATENT DOCUMENTS

| | | | |
|---|---|---|---|
| Re. 32,157 | * | 5/1986 | Waugh et al. ........................ 73/3 |
| 1,650,736 | * | 11/1927 | Zelov . |
| 2,853,874 | * | 9/1958 | Mennesson ........................ 73/40 |
| 3,041,834 | * | 7/1962 | Davies et al. ................... 60/39.09 |
| 3,092,821 | * | 6/1963 | Muehlner ........................ 340/238 |
| 4,168,621 | * | 9/1979 | Kreitenberg .................. 73/40.5 R |
| 4,437,162 | * | 3/1984 | Kato ............................... 364/442 |
| 4,475,377 | * | 10/1984 | Halpine ............................... 73/3 |
| 4,484,443 | * | 11/1984 | Takigawa et al. .................. 60/534 |
| 4,776,205 | * | 10/1988 | Brooks et al. .................... 73/37.9 |
| 4,811,252 | * | 3/1989 | Furuse ........................... 364/556 |
| 5,230,239 | * | 7/1993 | Gentile ............................ 73/49.3 |
| 5,337,617 | * | 8/1994 | Dimeff .......................... 73/861.54 |
| 5,347,771 | * | 9/1994 | Kobori et al. .................... 52/167 R |
| 5,461,311 | * | 10/1995 | Nakazato et al. .............. 324/207.24 |
| 5,631,632 | * | 5/1997 | Nakashima et al. .............. 340/611 |

\* cited by examiner

Primary Examiner—Daniel S. Larkin
Assistant Examiner—C D Garber
(74) Attorney, Agent, or Firm—Steinberg & Raskin, P.C.

(57) ABSTRACT

The present invention provides a leakage measuring device capable of measuring the leakage always accurately. In a leakage measuring device constructed such that a cylinder has an inside thereof divided into one pressure chamber and the other pressure chamber by a piston rod mounted in the cylinder, one pressure chamber is connected with a pressurizer and the other pressure chamber is connected with a circuit or the like which constitutes a measuring object, and based on the movement of the piston when one pressure chamber is pressurized, a leakage of the circuit or the like which constitutes the measuring object is measured, the improvement being characterized in that pressure receiving areas of the piston in both pressure chambers are made equal to each other, and a detection rod which is fixedly secured to the cylinder side is inserted into a detection hole formed along an axis of the piston while holding the detection rod in a non-contact condition, and the detection rod and the detection hole constitute a non-contact stroke sensor.

5 Claims, 6 Drawing Sheets

LEAKAGE MEASURING DEVICE

BACKGROUND OF THE INVENTION

1. Field of the Invention

The present invention relates to a leakage measuring device for measuring a leakage rate of a circuit or the like which constitutes a measuring object.

2. Description of the Prior Art

Figure 6:
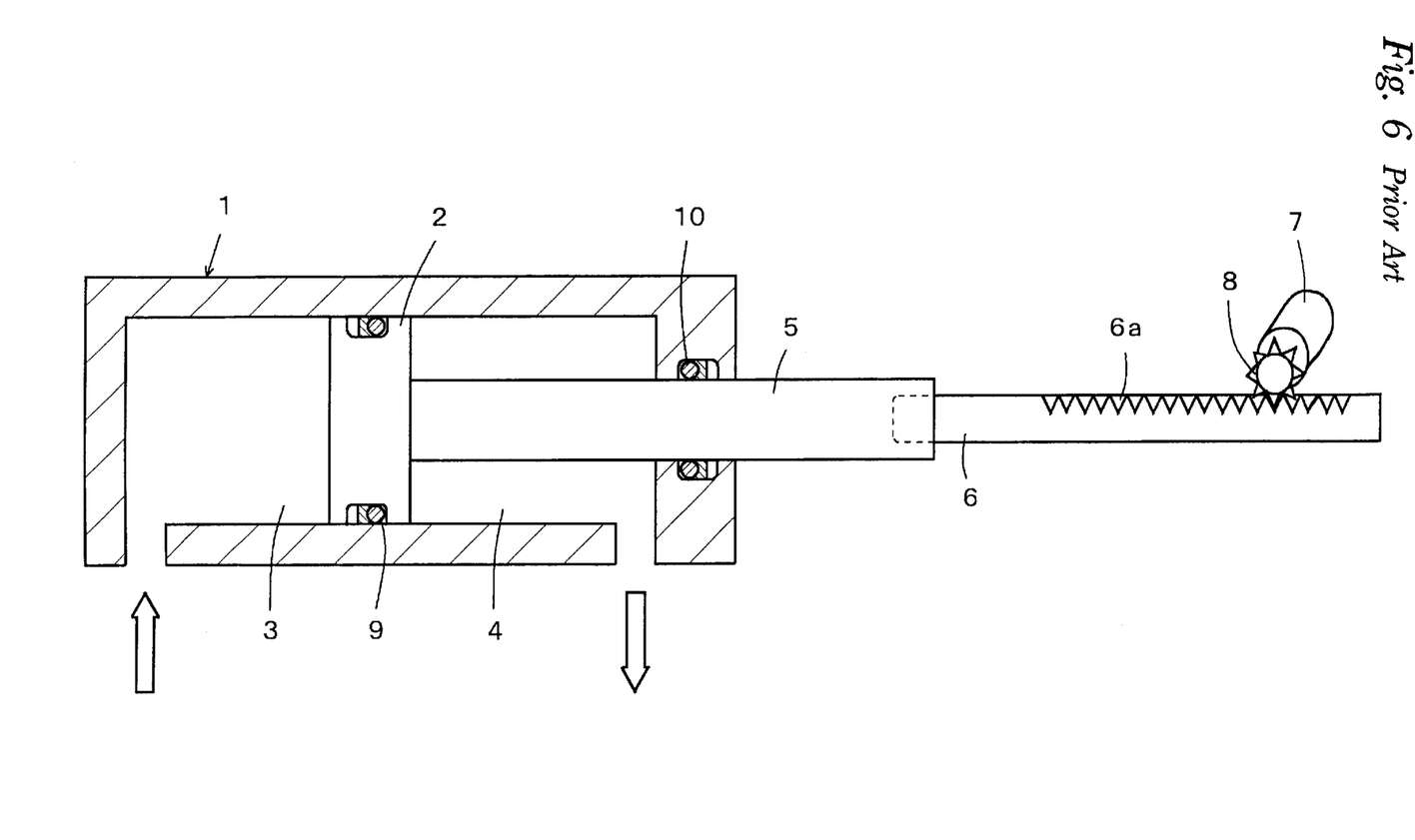
FIG. 6 is a cross-sectional view of a conventional leakage measuring device.

As a measuring device for the above purpose, a measuring device shown in FIG. 6 has been known conventionally.

This conventional measuring device incorporates a piston 2 in a cylinder 1 slidably and divides the inside of the cylinder 1 into one pressure chamber 3 and the other pressure chamber 4.

A piston rod 5 is mounted on a side surface of the piston 2 which faces the other pressure chamber 4 and this piston rod 5 is protruded outwardly from the cylinder 1.

A rack member 6 is provided to a distal end of the piston rod 5 and a rack 6a formed on the rack member 6 is meshed with a pinion 8 of an encoder 7. Accordingly, when the piston 2 is moved, the pinion 8 is rotated and a digital signal in response to the movement of the piston 2 is outputted from the encoder 7.

In the drawing, numeral 9 indicates a seal member provided around the periphery of the piston 2 for preventing a leakage between both chambers 3, 4, while numeral 10 indicates a seal member for sealing the periphery of the piston rod 5.

In an actual use of the measuring device having the above-mentioned construction, for example, one pressure chamber 3 is connected to a pressurizer not shown in the drawing and the other chamber is connected to a circuit or the like which constitutes a measuring object or an object to be measured.

When pressure is applied to one pressure chamber 3, if there is no leakage at the measuring object side, the piston 2 is not moved. However, if there is a leakage at the measuring object side, the piston 2 is moved. Accordingly, the movement of the piston 2 is proportional to the leakage at the measuring object side. Then, the movement of the piston 2 is measured by the encoder 7 so as to measure the leakage at the measuring object side.

In case the leakage rate at the measuring object side is zero and the piston 2 is stopped at a fixed position, the pressure generated in the other pressure chamber 4 is higher than the pressure generated in one pressure chamber 3. It is because that the pressure receiving area of the piston 2 in the other pressure chamber 4 is smaller than the pressure receiving area of the piston 2 in one pressure chamber 3 by the cross-sectional area of the piston rod 5.

Because of the presence of the pressure difference between these pressure chambers 3, 4, the measuring device must be provided with the seal member 9 around the periphery of the piston 2. It is because that the greater the pressure difference between these chambers 3, 4, the leakage from the high pressure side to the low pressure side is increased.

Furthermore, in proportion to the increase of the pressure in the other pressure chamber 4, the necessity of the seal member 10 is increased.

Figure 7:
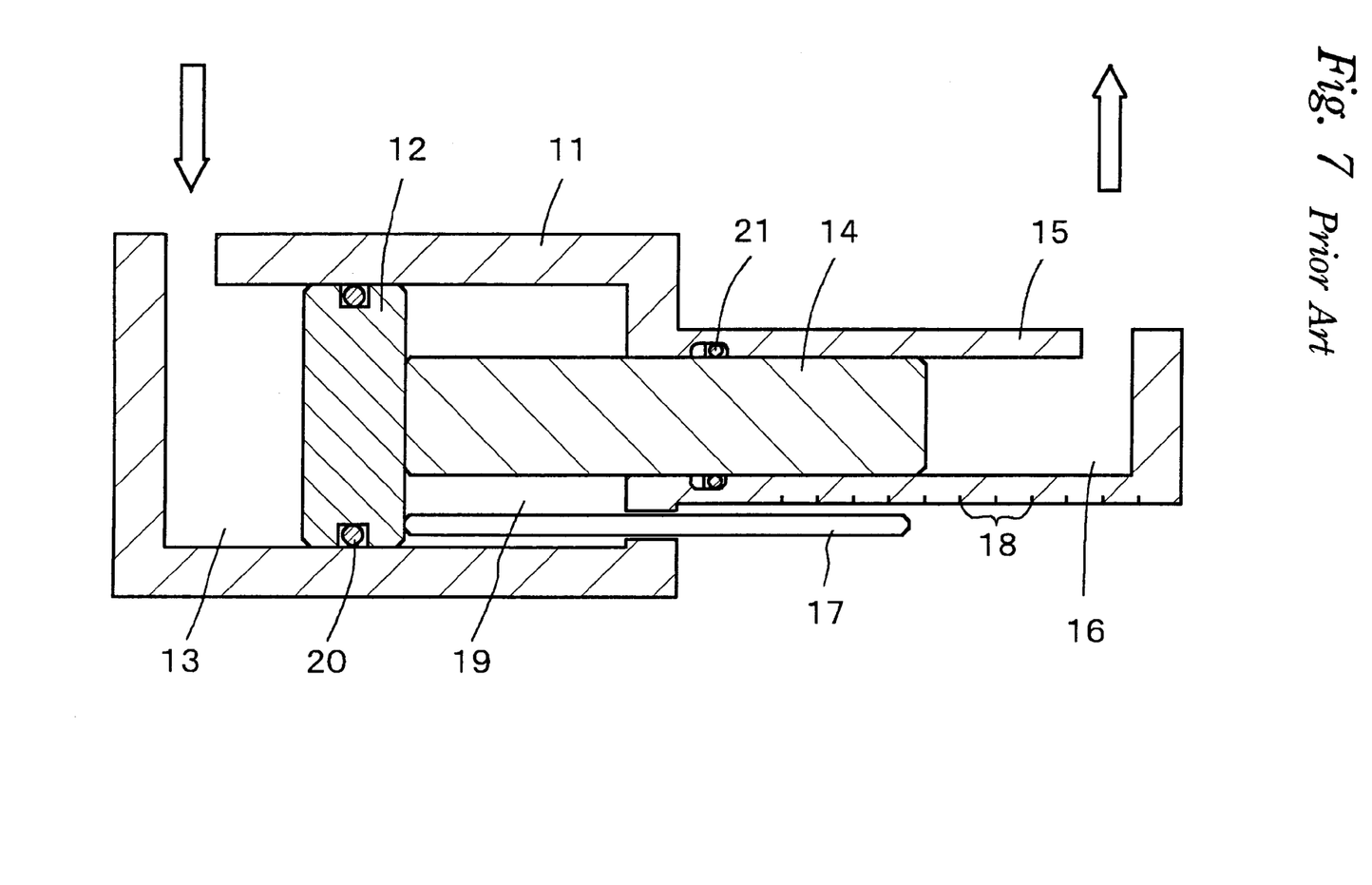
FIG. 7 is a cross-sectional view of another conventional leakage measuring device.

Besides the measuring device shown in FIG. 6, a measuring device shown in FIG. 7 has been also known conventionally.

The measuring device shown in FIG. 7 incorporates a piston 12 in a large diameter cylinder 11 and defines a pressurizing chamber 13. Air pressure is introduced into this pressuring chamber 13 by means of a pressurizer not shown in the drawing.

A plunger 14 is provided to a side surface of the piston 12 which is opposite to the pressurizing chamber 13. The plunger 14 has a distal portion thereof slidably incorporated in a small diameter cylinder 15 which is formed contiguously with the large diameter cylinder 11. A measuring pressure chamber 16 formed in the small diameter cylinder 15 is connected with a circuit which constitutes a measuring object.

The piston 12 is provided with a scale indication rod 17 and this scale indication rod 17 is protruded outwardly from the large diameter cylinder 11 in parallel with the small diameter cylinder 15. On the outside of the small diameter cylinder 15, a scale 18 is marked and this scale 18 and the scale indication rod 17 face with each other in an opposing manner as shown in the drawing.

In the drawing, numeral 19 indicates a drain chamber and numerals 20, 21 indicate seal members.

The measuring device having the above-mentioned construction adopts an operation principle similar to that of the measuring device shown in FIG. 6. Namely, when air pressure is supplied to the pressurizing chamber 13, the piston 12 is stopped at a position where the piston 12 is balanced with a pressure action of the measuring pressure chamber 16. Then, when an oil leakage occurs at the circuit side which constitutes the measuring object, the piston 12 is moved and this movement can be inspected visually in view of the correspondence between the scale indication rod 17 and the scale 18. Based on the movement of the piston 12 detected in this manner, the leakage at the measuring object side can be measured.

The measuring device shown in FIG. 6 has following problems.

Namely, as the pressure difference between both pressure chambers 3, 4 becomes large, the leakage from the other pressure chamber 4 which is at a high pressure to one pressure chamber 3 which is at a low pressure occurs.

When the leakage occurs between both pressure chambers 3, 4, it becomes difficult to determine whether the movement of the piston 2 is caused by a leakage at the measuring object side or the internal leakage of the measuring device per se. Accordingly, the leakage at the measuring object side cannot be measured accurately.

As means for preventing such a leakage, it is considered to increase an interference of the seal member 9. When the interference of the seal member 9 is increased, however, the piston 2 cannot enjoy the smooth movement and a so-called stick-slip phenomenon occurs. Accordingly, the measured value outputted from the measuring device is vigorously fluctuated resulting in the inaccurate measurement of the leakage.

Furthermore, even in case the interference is not increased, the seal members 9, 10 are deformed when they are respectively subjected to a high pressure and hence, the friction of the seal members 9, 10 is increased. In this manner, in case the friction of the seal members 9, 10 is increased during the measuring process, the relative relation between the pressure action of one pressure chamber 3 and the movement of the piston 2 cannot be fixed. In this case, the leakage cannot be measured accurately also.

The measuring device shown in FIG. 7 also has a problem that it cannot avoid adverse effects caused by the seal members 20, 21 and it is considerably difficult to inspect the movement of the piston 12 visually.

In any case, the above-mentioned conventional measuring devices have a problem that it cannot measure the leakage easily and accurately due to the interaction among various factors.

Accordingly, it is an object of the present invention to provide a leakage measuring device capable of always performing the accurate measurement of the leakage.

SUMMARY OF THE INVENTION

The present invention is based on a leakage measuring device which is constructed such that a cylinder has an inside thereof divided into one pressure chamber and the other pressure chamber by a piston rod mounted in the cylinder, one pressure chamber is connected with a pressurizer and the other pressure chamber is connected with a circuit or the like which constitutes a measuring object, and based on the movement of the piston when one pressure chamber is pressurized, a leakage of the circuit or the like which constitutes the measuring object is measured.

Based on the above measuring device, a first aspect of the present invention is characterized in that pressure receiving areas of the piston in both pressure chambers are made equal to each other, and a detection rod which is fixedly secured to the cylinder side is inserted into a detection hole formed along an axis of the piston while holding the detection rod in a non-contact condition, and the detection rod and the detection hole constitute a non-contact stroke sensor.

The first aspect of the present invention can make both pressure receiving areas of the piston equal as mentioned above and hence, the pressures in both pressure chambers can be held equal. Accordingly, without using a seal member, a leakage between these pressure chambers can be almost eliminated.

A second aspect of the present invention is based on the first aspect of the present invention and is characterized in that a lap portion is formed at the center of the inside of the cylinder and the piston is slidably inserted into a hole formed in the lap portion.

A third aspect of the present invention is based on the second aspect of the present invention and is characterized in that the lap portion is formed separately from the cylinder and the lap portion is sandwiched by a step portion formed in the inside of the cylinder and a collar provided at a side opposite to the step portion so as to restrict the movement of the lap portion in an axial direction.

A fourth aspect of the present invention is based on the second aspect of the invention and is characterized in that the lap portion is formed separately from the cylinder and the lap portion is sandwiched by a pair of collars incorporated in the cylinder so as to restrict the movement of the lap portion in an axial direction.

According to the third and fourth aspects of the present invention, the lap portion is formed separately from the cylinder and hence, once the collar is removed, the lap portion can be readily removed from the cylinder.

A fifth aspect of the present invention is based on the first to fourth aspects of the present invention and is characterized in that a coil is disposed in a detection hole formed in the piston and a core is disposed at a detection rod side, and the coil and the core constitute a differential transformer, and based on an induced voltage which varies corresponding to a position of the core, the movement of the piston is measured.

A sixth aspect of the present invention is based on the first to fourth aspects of the present invention and is character-ized in that a hollow hole is formed on an axis of a detection rod provided to the cylinder side, a support rod is provided to the piston side, the support rod is inserted in the hollow hole while holding a non-contact condition, a magnetoresistive element is mounted on either one of the hollow hole or the support rod, and an opposing magnet is mounted on the other one, and based on an electric resistance which varies corresponding to the relative movement between both of them, the movement of the piston is measured.

DETAILED DESCRIPTION OF THE INVENTION

Figure 1:
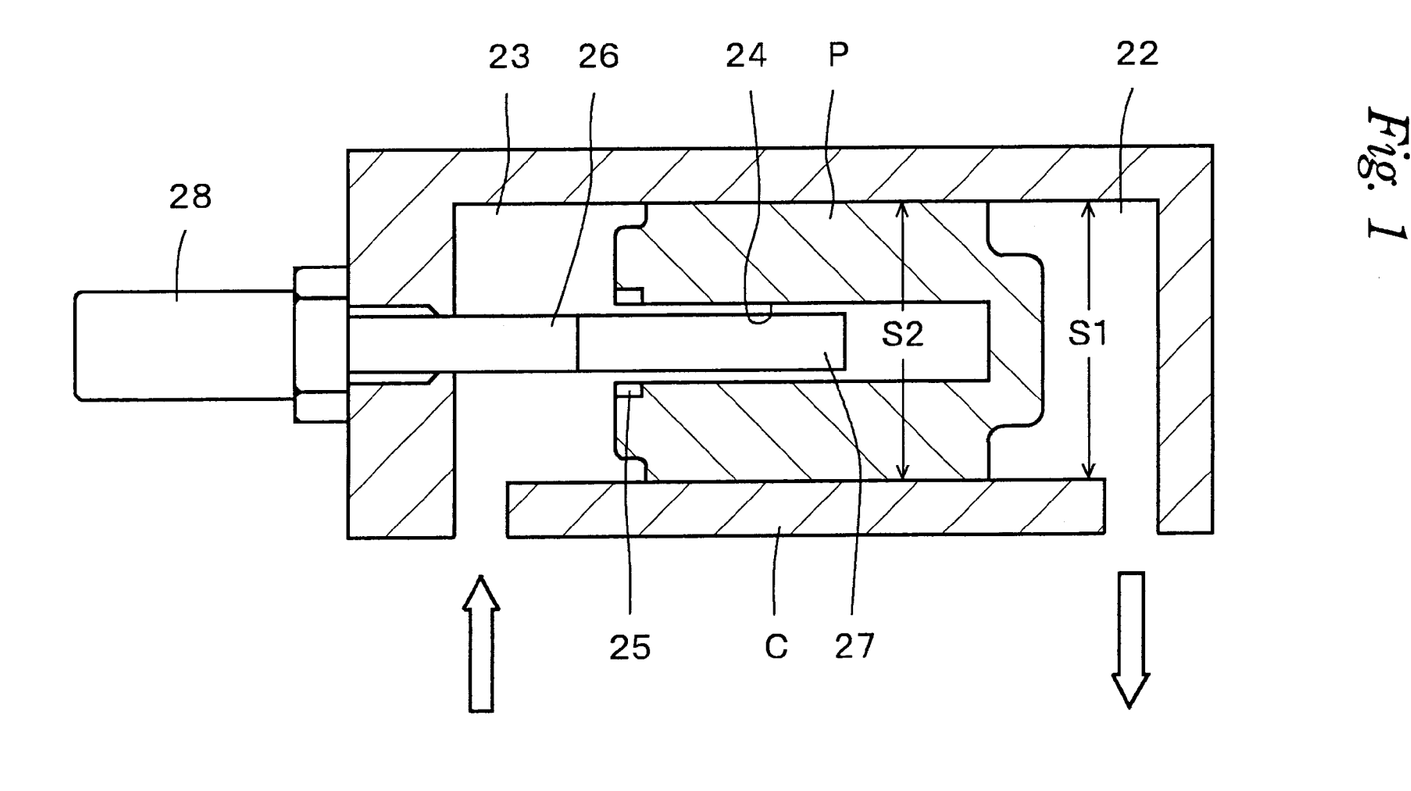
FIG. 1 is a cross-sectional view of a first embodiment of the present invention.

In a first embodiment shown in FIG. 1, a piston P is slidably incorporated in a cylinder C and the cylinder C has an inside thereof divided into one pressure chamber 22 and the other pressure chamber 23.

The piston P is provided with a detection hole 24 on an axis thereof and this detection hole 24 opens only to the other pressure chamber 23 side. A pressure receiving area S1 at one pressure chamber 22 side is made equal to a pressure receiving area S2 at the other pressure chamber 23 side including a bottom portion of the detection hole 24.

A coil 25 is mounted on an opening portion of the detection hole 24.

At the other pressure chamber 23 side, a detection rod 26 is fixedly secured to the cylinder C and this detection rod 26 is inserted in the detection hole 24. The diameter of the detection rod 26 is made smaller than the inner diameter of the detection hole 24 so as to hold them in a non-contact condition. By holding them in a non-contact condition, the pressure in the inside of the other pressure chamber 23 acts on the bottom portion of the detection hole 24. Accordingly, as mentioned above, the pressure receiving areas S1 and S2 of both pressure chambers 22, 23 can be made equal.

It is needless to say that a special communication hole may be formed in a piston P for positively introducing the pressure in the inside of the other pressure chamber 23 into the detection hole 24.

A core 27 is mounted on the detection rod 26 and this core 27 and the above-mentioned coil 25 constitute a differential transformer as a non-contact stroke sensor. The detection rod 26 is electrically connected with a detector 28 mounted on the outside of the cylinder C.

The differential transformer having the above construction varies an induced voltage in response to a position of the core 27 and by detecting the variation of this induced voltage with the detector 28, the movement of the piston P is detected.

The manner of operation of the first embodiment is hereinafter explained.

For example, when one pressure chamber 22 is connected to an measuring object side and the other pressure chamber 23 is connected to a pressurizer not shown in the drawing, if there is no leakage at the measuring object side, the pressures of both pressure chambers 22, 23 are made equal and the piston P is held in a stop position. The reason why the pressures of both pressure chambers are made equal is that the pressure receiving areas of both chambers are equal.

The pressures of both pressure chambers 22, 23 being equal means that there is no leakage between the pressure chambers. Accordingly, in this embodiment, it is unnecessary to mount a conventional seal member around the periphery of the piston P.

When the leakage occurs at the measuring object side, the pressure in the inside of one pressure chamber 22 is lowered corresponding to the amount of leakage. Therefore, the piston P is moved in a right direction in the drawing and an induced voltage corresponding to the movement of the piston P is generated at the differential transformer. This induced voltage is detected by the detector 28 and hence, the movement of the piston P, namely, the leakage at the measuring object side is measured.

As mentioned above, according to the first embodiment, the pressure receiving areas S1, S2 of the piston P can be made equal and hence, the pressures of both chambers 22, 23 when the piston P is stopped can be held equal. Since the pressures of both chambers can be held equal in this manner, there is no leakage between the chambers 22, 23. Therefore, the provision of the seal member around the piston and the piston rod which has been necessary conventionally is no more necessary. Since the seal member is unnecessary, various problems which occur due to the seal member can be totally solved.

The use of the non-contact stroke sensor made of the differential transformer greatly contributes to making the pressure receiving areas of both pressure chambers equal. Namely, with the provision of the differential transformer, the pressure of the pressure chamber 23 can be introduced into the detection hole 24. With the construction which positively introduces the pressure into the detection hole 24, the bottom portion can be used as a pressure receiving surface. Since the bottom portion of the detection hole 24 can be used as the pressure receiving surface, the pressure receiving areas of both pressure chambers 22, 23 can be made equal.

Figure 2:
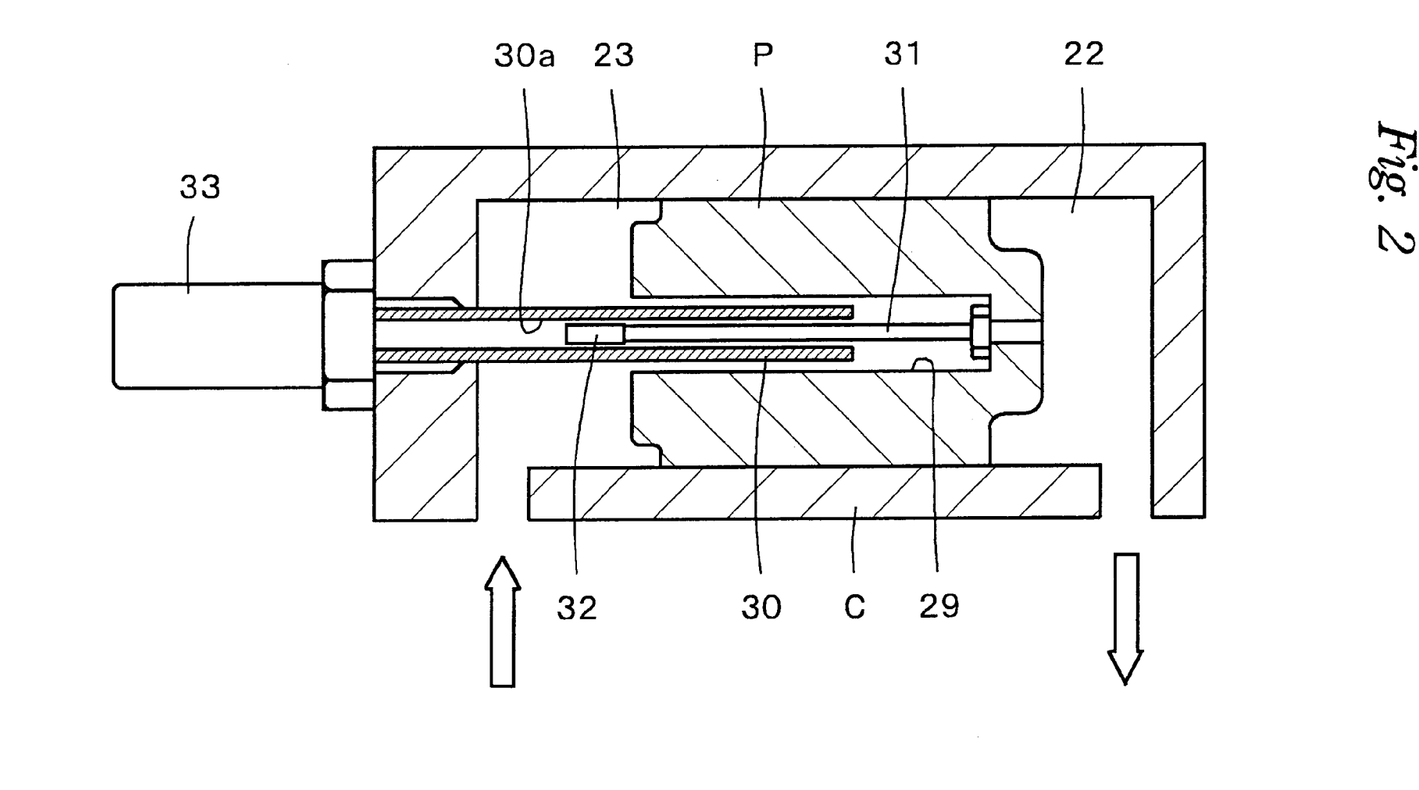
FIG. 2 is a cross-sectional view of a second embodiment of the present invention.

The second embodiment shown in FIG. 2 has the same construction as that of the first embodiment with respect to its construction that a detection hole 29 is formed in the piston P and a detection rod 30 provided to the cylinder C side is inserted into the detection hole 29.

In this second embodiment, however, a hollow hole 30a is formed along an axis of the above-mentioned detection rod 30 and a magnetoresistive element not shown in the drawing is mounted on the inner periphery of the hollow hole 30a.

Furthermore, a support shaft 31 is fixedly secured to the bottom portion of the detection hole 29 and an opposing magnet 32 is fixedly secured to the distal end of the support rod 31.

Accordingly, when the piston P is moved, the relative position between the magnetoresistive element and the opposing magnet 32 is shifted so that an electric resistance also is changed. This change of electric resistance is detected by a detector 33 and hence, the movement of the piston P, namely, the leakage at the measuring object side can be measured.

In this second embodiment, it is also needless to say that the support rod 31 and the opposing magnet 32 are held in a non-contact condition relative to the hollow hole 30a of the detection rod 30. In this manner, since the relation between the detection rod 30 and the piston P and the relation between the support rod 31 and the hollow hole 30a are respectively set to the non-contact condition, the pressure receiving areas of the insides of the pressure chambers 22, 23 can be made equal.

Accordingly, the second embodiment also enjoys advantages or effects similar to those of the first embodiment.

Figure 3:
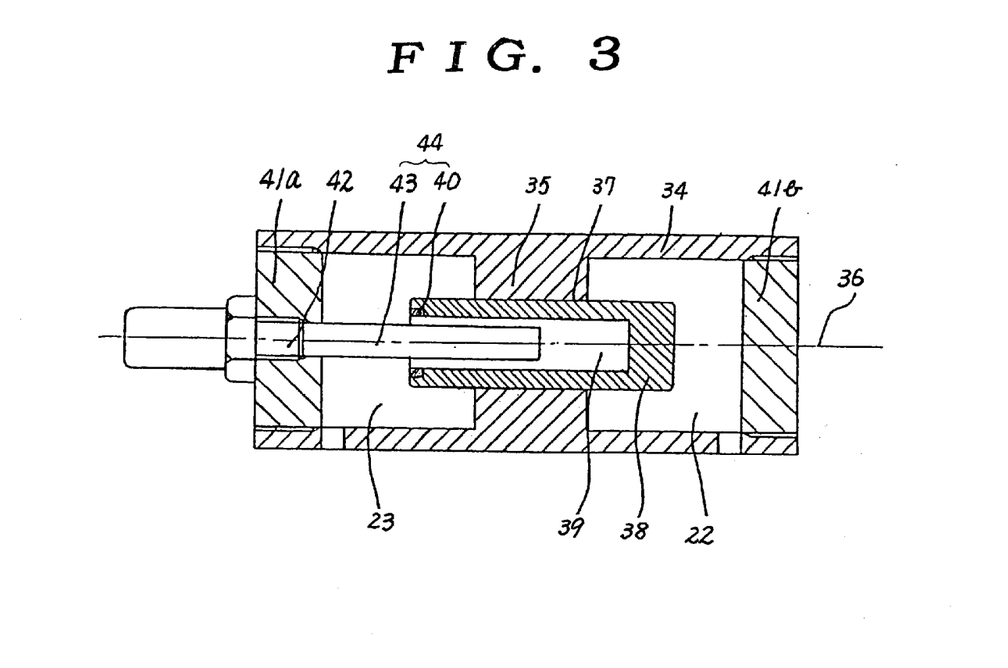
FIG. 3 is a cross-sectional view of a third embodiment of the present invention.

In the third embodiment shown in FIG. 3, a lap portion 35 is integrally molded with a cylinder 34 in the vicinity of the center of the cylinder 34 and lids 41a, 41 are screwed into both ends of the cylinder 34. The axial length of this lap portion 35 is made shorter than the entire length of the cylinder 34. The inside of the cylinder 34 is divided into two pressure chambers 22, 23 by the lap portion 35.

In the lap portion 35 formed in the above manner, a hole 37 is formed coaxially with a central axis 36 of the cylinder 34 and a piston 38 is slidably inserted in the hole 37.

A detection hole 39 is formed in the piston 38 along the central axis 36 of the cylinder 34 and a detection coil 40 is mounted on the left-side end of the detection hole 39 in the drawing.

A detection rod 42 is fixedly secured to the lid 41a screwed to the left-side end of the cylinder 34 in the drawing and the distal end of the detection rod 42 is inserted into the detection hole 39 formed in the piston 38 while holding a non-contact condition. The detection coil 40 and a core 43 mounted on the detection rod 42 constitute a stroke sensor 44 which detects the stroke of the piston 38.

To the inner periphery of the hole 37 of the lap portion 35, a high-precision machining is applied for preventing a fluid from leaking through a gap between the outer periphery of the piston 38 and the inner periphery of the hole 37. The range that the high-precision machining is applied is a far shorter range compared to the axial length of the cylinder 34.

According to this third embodiment, as in the case of the first embodiment, based on the movement of the piston 38, the leakage rate of the circuit which constitutes the measuring object can be measured. Furthermore, it is unnecessary to mount the seal member on the piston or the like and hence, various problems which occur due to the seal member can be totally solved.

Furthermore, the third embodiment can enjoy a special advantage or effect which the first and second embodiments cannot enjoy.

Namely, in the first and the second embodiments which are described previously, for preventing the leakage of the fluid through a slide surface between the cylinder 34 and the piston 38, the gap between the inner peripheral surface of the cylinder C and the outer peripheral surface of the piston P must be held at the high precision. To this end, in the first and the second embodiment, the high-precision machining is applied to the range that the stroke of the piston P covers, namely, the entire range of the inner periphery of the cylinder C.

However, applying of the high-precision machining to the entire range of the inner periphery of the cylinder C inevitably increases the machining cost.

To the contrary, according to the third embodiment, the lap portion 35 is formed in the cylinder 34 and only the range of the lap portion 35 is subjected to the high-precision machining.

Therefore, it is unnecessary to apply the high-precision machining to the whole area of the inner periphery of the cylinder 34 and hence, the machining cost can be reduced accordingly.

Figure 4:
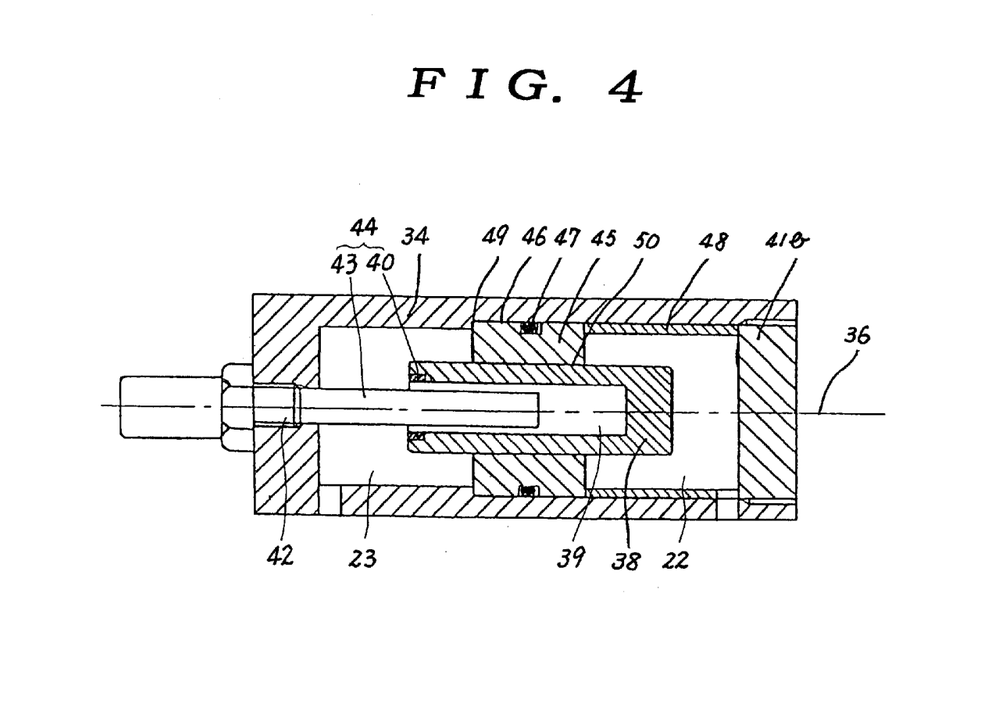
FIG. 4 is a cross-sectional view of a fourth embodiment of the present invention.

In the fourth embodiment shown in FIG. 4, a lap portion 45 is provided separately from the cylinder 34 and is replaceably mounted to the cylinder 34.

Namely, in the vicinity of the center of the inside of the cylinder 34, a large diameter portion 46 is formed and this large diameter portion 46 is incorporated in the lap portion 45. A seal member 47 is incorporated between the lap portion 45 and the large diameter portion 46 and the sealing between the lap portion 45 and the large diameter portion 46 is assured by this sealing member 47.

The lap portion 45 has one end thereof pushed against a step portion 49 formed in the cylinder 34 by means of a collar 48 inserted into the large diameter portion 46 and a lid 41b screwed to the cylinder 34 and hence, the axial movement of the lap portion 45 can be restricted. On the other hand, by removing the lid 41b and the collar 48 from the cylinder 34, the lap portion 45 can be readily removed from the cylinder 34.

A hole 50 is formed in the lap portion 45 provided in the above manner along a central axis 36 of the cylinder 34 and the piston 38 is slidably inserted into the hole 50 in the same-manner as the third embodiment.

According to the fourth embodiment, the lap portion 45 is provided separately from the cylinder 34 and is replaceable from the cylinder 34 and hence, even when the inner peripheral surface of the hole 50 formed in the lap portion 45 is damaged and the sealing is deteriorated, the lap portion 45 can be removed from the cylinder 34 and the inner periphery thereof is machined again so that the operability is greatly enhanced.

Furthermore, it is possible to replace only this lap portion 45 and hence, the parts cost can be reduced compared to the replacement of the cylinder 34.

Figure 5:
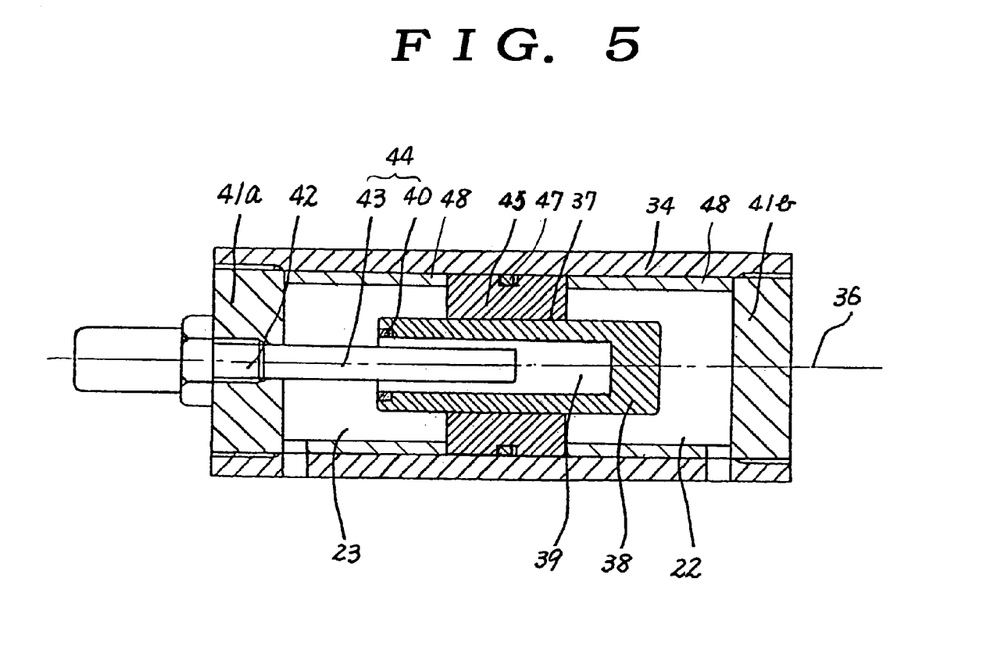
FIG. 5 is a cross-sectional view of a fifth embodiment of the present invention.

In the fifth embodiment shown in FIG. 5, collars 48, 49 are mounted on both ends of the lap portion 45 and the axial movement of the lap portion 45 is restricted by these collars 48, 49.

According to the fifth embodiment, by removing either one of the lid 41a or 41b from the cylinder 34 and there after removing either one of the collar 48, 49, the lap portion 45 can be readily removed.

Although the measuring object is connected to one pressure chamber 22 and the pressurizer is connected to the other pressure chamber 23 in the above-mentioned first to fifth embodiments, they may be connected in a reverse manner. Namely, the pressurizer may be connected to one pressure chamber 22 and the measuring object is connected to the other pressure chamber 23. Even with such a reverse connection, the leakage of the measuring object can be accurately measured based on the movement of the piston.

Furthermore, the measuring object of the first to the fifth embodiments may be hydraulic apparatuses or apparatuses which are operated by air pressure. Namely, with the above-mentioned embodiments, both the leakage of liquid and the leakage of gas can be accurately measured.

As has been described heretofore, according to the first to fifth aspects of the present invention, the pressure receiving areas of both pressure chambers of the cylinder can be made equal and hence, the internal leakage between both pressure chambers can be substantially eliminated.

By eliminating the internal leakage in this manner, the cause of the movement of the piston can be always measured as the leakage at the measuring object side. Accordingly, the leakage can be always measured accurately.

Furthermore, the seal member is no more necessary so that the stick-slip phenomenon which occurred conventionally due to the seal member can be eliminated and the piston is always moved smoothly. Accordingly, the values outputted from the leakage measuring device becomes stable.

Particularly, according to the second invention, the piston is slidably inserted into the hole formed in the lap portion and hence, the range which requires a high-precision machining can be limited to the inner periphery of the hole of the lap portion. Accordingly, compared to a case which applies the high-precision machining to the entire surface of the inner periphery of the cylinder, the machining cost can be reduced. Furthermore, according to the third and fourth inventions, the lap portion can be readily removed from the cylinder and hence the operability at the time of machining the inner periphery of the lap portion again is enhanced and the lap portion can be readily replaced with other lap portion.

What is claimed is:

1. A leakage measuring device constructed such that a cylinder has an inside thereof divided into one pressure chamber and an other pressure chamber by a piston rod mounted in said cylinder, said one pressure chamber is connected with a pressurizer and said other pressure chamber is connected with a circuit which constitutes a measuring object, and based on the movement of said piston when said one pressure chamber is pressurized, a leakage of said circuit which constitutes said measuring object is measured, the improvement being characterized in that pressure receiving areas of said piston in said one pressure chamber and said other pressure chamber are made equal to each other, and a detection rod which is fixedly secured to said cylinder side is inserted into a detection hole formed along an axis of said piston while holding said detection rod in a non-contact condition, said detection rod and said detection hole constitute a non-contact stroke sensor; and wherein a lap portion is formed in the vicinity of the center of the inside of said cylinder and said piston is slidably inserted into a hole formed in said lap portion.

2. A leakage measuring device according to claim 1, wherein said lap portion is formed separately from said cylinder and said lap portion is sandwiched by a step portion formed in the inside of said cylinder and a collar provided at a side opposite to said step portion so as to restrict the movement of said lap portion in an axial direction.

3. A leakage measuring device according to claim 1, wherein said lap portion is formed separately from said cylinder and said lap portion is sandwiched by a pair of collars incorporated in said cylinder so as to restrict the movement of said lap portion in an axial direction.

4. A leakage measuring device according to claim 1, wherein a coil is disposed in a detection hole formed in said piston and a core is disposed at a detection rod side, and said coil and said core constitute a differential transformer which is a non-contact stroke sensor, and based on an induced voltage which varies corresponding to a position of said core, the movement of said piston is measured.

5. A leakage measuring, device constructed such that a cylinder has an inside thereof divided into one pressure chamber and another pressure chamber by a piston rod mounted in said cylinder, said one pressure chamber is connected with a pressurizer and said other pressure chamber is connected with a circuit which constitutes a measuring object, and based on the movement of said piston when said one pressure chamber is pressurized, a leakage of said circuit which constitutes said measuring object is measured, the improvement being characterized in that pressure receiving areas of said piston in said one pressure chamber and said other pressure chamber are made equal to each other, and a detection rod which is fixedly secured to said cylinder side is inserted into a detection hole formed along an axis of said piston while holding said detection rod in a non-contact condition, said detection rod and said detection hole constitute a non-contact stroke sensor, and wherein a hollow hole is formed on an axis of a detection rod provided to said cylinder side, a support rod is provided to said piston side, said support rod is inserted in said hollow hole while holding a non-contact condition, a magnetoresistive element is mounted oil either one, of said hollow hole or said support rod, and an opposing, magnet is mounted on said the other one to thereby constitute a non-contact stroke sensor, and based on an electric resistance which varies corresponding to the relative movement between said magnetoresistive element and said opposing magnet, the movement of said piston is measured.

* * * * *